United States Patent [19]
Mraz

[11] 3,954,021
[45] May 4, 1976

[54] GEAR BOX WITH COMMON SELECTOR FORK ACTUATOR

[75] Inventor: Vladimir Mraz, Strakonice, Czechoslovakia

[73] Assignee: Ceske zavody motocyklove, narodni podnik, Strakonice, Czechoslovakia

[22] Filed: Nov. 29, 1973

[21] Appl. No.: 420,144

[30] Foreign Application Priority Data
Nov. 30, 1972 Czechoslovakia............... 8158-72

[52] U.S. Cl............................. 74/473 R; 74/337.5; 192/93 R
[51] Int. Cl.² ........................................ B60K 20/12
[58] Field of Search............. 74/473 R, 337.5, 567, 74/110, 503, 475, 477; 192/93 R, 70.23

[56] References Cited
UNITED STATES PATENTS
| 712,583 | 11/1902 | Packard et al.................. 74/337.5 X |
| 1,400,494 | 12/1921 | Woodhull .......................... 74/337.5 |

FOREIGN PATENTS OR APPLICATIONS
| 261,394 | 8/1927 | United Kingdom................ 74/337.5 |
| 662,264 | 12/1951 | United Kingdom................ 74/337.5 |

Primary Examiner—Samuel Scott
Assistant Examiner—John Reep
Attorney, Agent, or Firm—Murray Schaffer

[57] ABSTRACT

A gear box having a plurality of selector forks which are mounted to be movable along a common axis is shiftable by a rectangular plate like gate movable in an axis angular to the axis of shifting of the forks. The gate and the forks are provided with cooperative means by which each of the forks are moved simultaneously with the other into predetermined positions. The gate is carried by an elongated circular guide rod fixed at each end to the housing and which extends parallel to the axis of movement of the gate. The gate is provided with at least one slide bearing having a circular bore fixed to the gate and located about the guide rod. In addition, means for stabilizing the gate against rotation about the axis of the guide rod is provided.

10 Claims, 7 Drawing Figures

GEAR BOX WITH COMMON SELECTOR FORK ACTUATOR

BACKGROUND OF THE INVENTION

The present invention relates to the construction of vehicular transmissions and in particular to the construction of a gear box for shifting the transmissions of motorcycles and similar small vehicles.

As is known, the transmission for motorcycles and similar vehicles comprises a set of gears arranged so as to be shiftable into cooperative engagement with each other to provide a variety of transmission speeds. The shifting of the gears is accomplished through the operation of a plurality of selector or shift forks which are actuable in unison by a shift gate which is manually movable by the gear lever. The gate in general, is a flat plate in which is provided a groove associated with each of the selector forks and in which the fork actuating pin is received. On movement of the plate each of the selector forks is shifted a predetermined or selected distance to obtain a combination of gear engagement as desired. Until now the movement of the shift gate in its horizontal plane and in its straight angular or rectangular direction has been controlled by holding the gate at its top and bottom and by guiding it in retaining rails or the like engaging each of the opposite flank edges. This arrangement requires a high degree of precision in forming and cutting all of the guiding surfaces and grooves. This precision was not always possible and in most cases it was necessary to compensate for the variance in manufacturing tolerances by the use of complex and expensive means merely to ensure the proper movement of the gate.

It is the object of the present invention to provide a gear box construction of the type described which overcomes the disadvantages of the known prior art.

It is a further object of the present invention to provide a gear box construction of the type described which is simple, inexpensive, easily manufactured and repaired.

It is a further object of the present invention to provide a gear box construction of the type described in which manufacturing accuracy and precision of construction is obtained with simple methods and at a low expense.

It is a further object of the present invention to provide a gear box construction of the type described having a smaller number of assembly relationships requiring precise tolerance, the result of which is a greater shifting accuracy.

It is a further object of the present invention to provide a gear box construction of the type described in which the gate may be precisely indexed and positioned in its several shift positions and wherein the gate is easily and simply locked in such position.

The foregoing objects, other objects, and numerous advantages will be apparent from the following disclosure of the present invention.

SUMMARY OF THE INVENTION

According to the present invention, a gear box is provided in which a plurality of selector forks are mounted to be movable along a common axis and a substantially flat rectangular shift gate is provided to move in an axis angular to the common axis of the forks. The gate is mounted so as to move in a fixed plane by providing an elongated circular guide rod fixed at each end to the gear box housing parallel to the axis of movement of the gate. The gate is provided with at least one slide bearing having a circular bore located about the guide rod. Means are provided for stabilizing the gate against rotation about the axis of the guide rod so that the gate is shiftable in its plane. In one form of the invention the means for stabilizing the gate against rotation comprises a roller bearing or pulley engaging the surface of the gate and in another embodiment the means for stabilizing the gate against rotation comprises a second guide rod and associated slide bearings spaced from the first guide rod.

The present invention is also cabable of several additional embodiments. In one instance the guide rod may be arranged in the middle of the gate and the roller bearings are arranged along each of the parallel edges of the gate. In still another embodiment a pair of guide rods are respectively arranged along each of the opposite sides of the gate.

The present invention is further provided with a latching or locking mechanism arranged to secure the gate in any one of its several selected position. The latching mechanism is provided with a locking pawl engaging spaced recesses and is biased by a spring. In one instance the locking pawl is biased against the face of the gate which contains the recesses and in a second instance against the surface of the guide rod which then contains the recesses. In the first instance the pawl is arranged to provide a force directed against the stabilizing means, such as the roller bearing, so as to resiliently hold the gate in its plane of position.

Full details of the present invention are given in the following description of its preferred form and are shown in the accompanying drawings.

DESCRIPTION OF THE INVENTION

Figure 1:
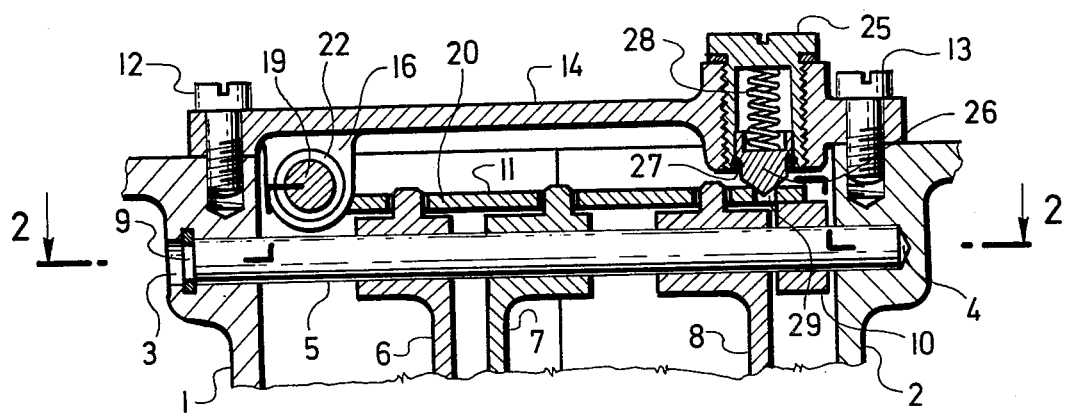
FIG. 1 is a sectional view of a gear box employing the present invention taken along the line 1—1 of FIG. 2.
Figure 2:
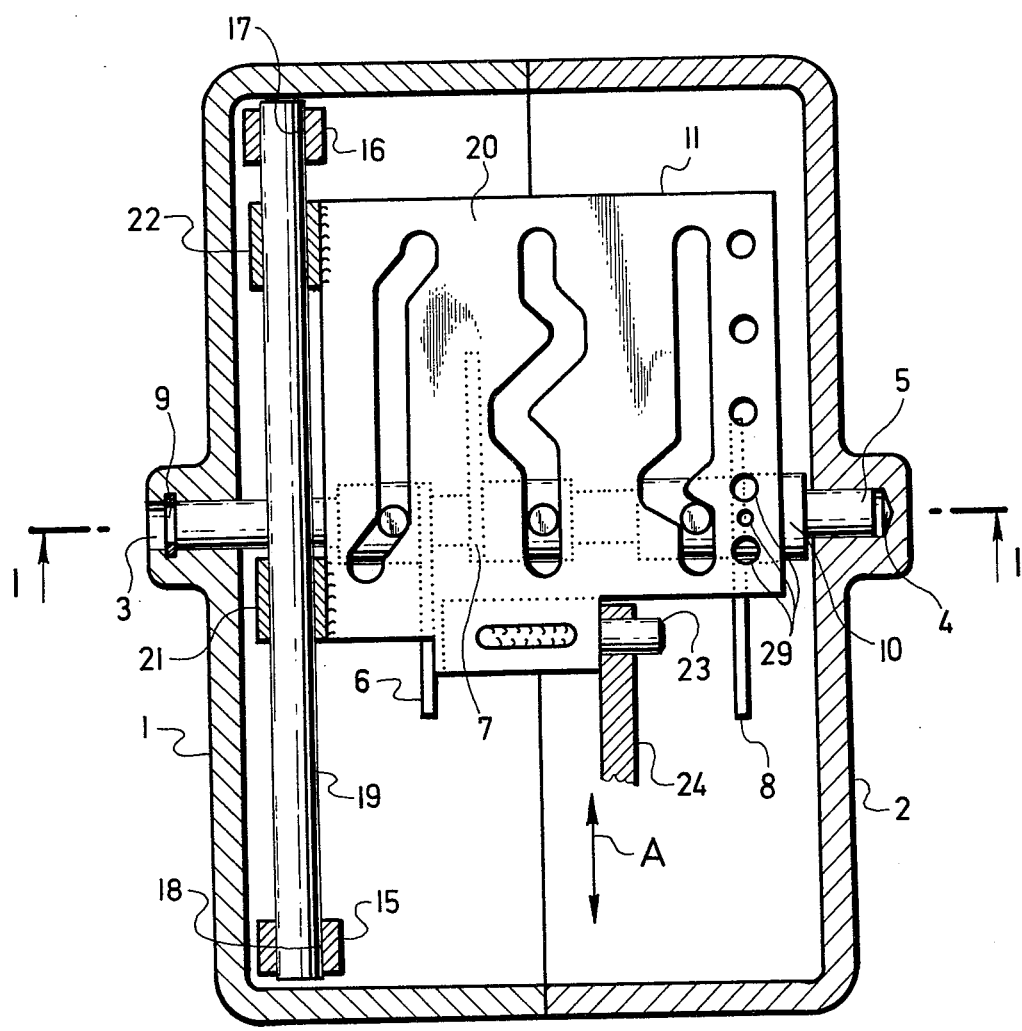
FIG. 2 is a plane view of the embodiment of FIG. 1 taken along the line 2—2 of FIG. 1.

The broad concepts of the present invention may be obtained by initially turning to FIGS. 1 and 2. A rectangular box like housing is depicted having a pair of opposed longitudinal side walls and enclosing end walls. The rectangular box like housing forms a symmetrical left half section 1 and a right half section 2 which are provided with bore holes 3 and 4, respectively. The bore holes 3 and 4 are drilled from the inner surfaces of the housing into a peripheral boss or rim and lie opposite each other along a transverse axis. A shaft 5 is set within the bore holes 3 and 4. A plurality of gear shift or selector forks 6, 7 and 8 are slidably carried on the shaft 5 between the holes 3 and 4. A retaining ring or C-clamp 9 is located at the one end of the shaft 5 so as to retain the shaft in its position. Mounted at the right end of the shaft 5 is a pulley or roller bearing 10. The pulley may be a simple sleeve which is rotatable about the axis of the shaft 5 or if desired, it may be a more complex roller bearing having inner and outer race rings. The pulley 10 may be loosely carried on the rod if desired and its axial movement limited by the inner wall of the right half section 2 and by the flanking surface of the selector fork 8 which is the one most adjacent to the wall 2. A substantially flat rectangular shift gate 11 is mounted above the selector forks and between the side walls of the housing. The top of the housing is enclosed by means of screws 12 and 13 with a cover 14. The cover 14 is precisely positioned in a conventional manner by the use of centering pins or suitable bushings (not shown) so as to be fit accurately with respect to the housing. The cover 14 is provided with a pair of spaced supporting blocks 15 and 16 which are integrally secured on its lower surface. The supporting blocks 15 and 16 depend downwardly and have bores 17 and 18, respectively, which are aligned along an axis parallel to the side walls. A guide rod 19, having a circular cross section is fixed within the blocks 15 and 16. The shift gate 11 is a flat plate like member 20 preferably formed by stamping or similarly accurate machining so as to have a plurality of shaped or cam like slots receiving the actuating pins of the respective selector forks. The gate 11 is provided with a pair of slide bearings 21 and 22 along its left edge adjacent its forward and rear corners. The slide bearings have circular bores which conform to the guide rod 19 so as to permit the plate 20 to be slidable with respect to the guide rod 19. The shift gate 11 extends over the pulley 10 which engages its lower face in either slidable or roller engagement. The pulley 10 stabilizes the gate 11 against rotation about the axis of the guide rod 19 and ensures the fact that the gate 11 is maintained in its planar position during its operation.

Extending laterally from the rear edge of the gate 11 is a pin 23 which is secured by welding or similar fastening techniques in a shoulder or boss extending from the plate 20. A push-pull manual shift lever 24 is journalled about the pin 23 and is actuated in known manner by a shift mechanism not shown.

The slots formed in the plate 20 forming the gate 11, provide shaped cams through which the actuating pins of each of the forks extend. Manipulation of the push-pull rod 24 causes the gate to move in its horizontal plane along a longitudinal axis indicated by the double arrow A, which movement is maintained in this direction by the guide rod 19 and which in conjunction with the pulley 10 acts to maintain the gate 11 in its planar position. As the gate 11 moves in its longitudinal direction the selector forks 6, 7 and 8 are caused to shift transversely on the shaft 5, synchronously, so as to cause the gears which they engage to mesh in a suitable arrangement providing the transmission with its several forward and reverse speeds as is well known in this art. A showing of the transmission gears and their relationship with the selector forks is not made in the drawing nor is it necessary to discuss further herein since reference can be made to any suitable publication, patent or the like showing this construction.

The indexing of the gate 11 is regulated and controlled by a locking or latching mechanism comprising a hollow open ended screw 25 fixed within the cover 14. A pawl 26 is movably retained within the bore of the screw 25 by a C-clamp or retaining ring 27 and is resiliently biased by a spring 28. The pawl 26 presses against the top surface of the gate and is adapted thus to act on the gate with a resilient steadying action assisting in the stabilization of the gate 11. The embodiment shown in FIGS. 1 and 2, the screw and pawl latching arrangement is located substantially opposite to the pulley 10 and along the edge of the gate 11 opposite to that of the guide rod 19. The surface of the gate 11 is provided with a series of recesses 29, such as holes, spaced along a line parallel to the longitudinal axis. The recesses 29 are spaced to conform to the positions the gate 11 takes with respect to the forward and neutral shift positions so that the pawl is securely locked within a given recess on the shifting of the gate into its particular position.

Figure 3:
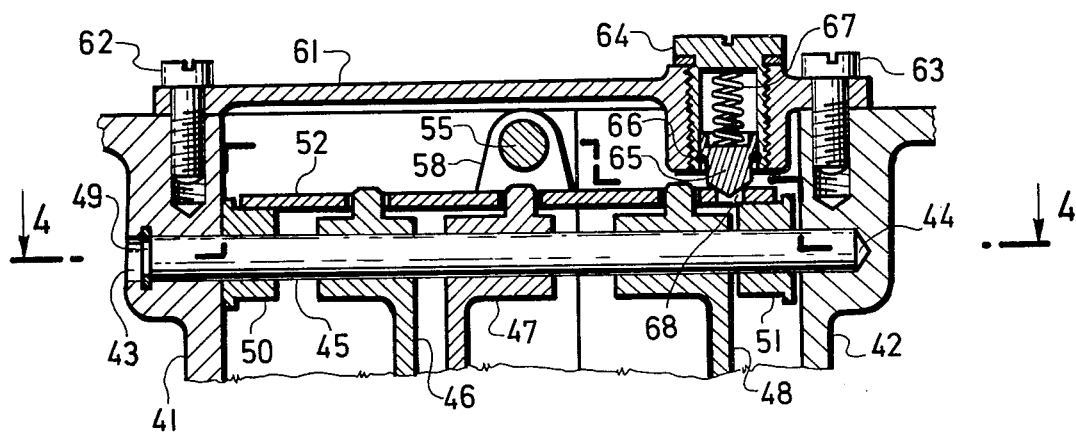
FIG. 3 is a sectional view similar to that of FIG. 1 showing a second embodiment of the present invention.
Figure 4:
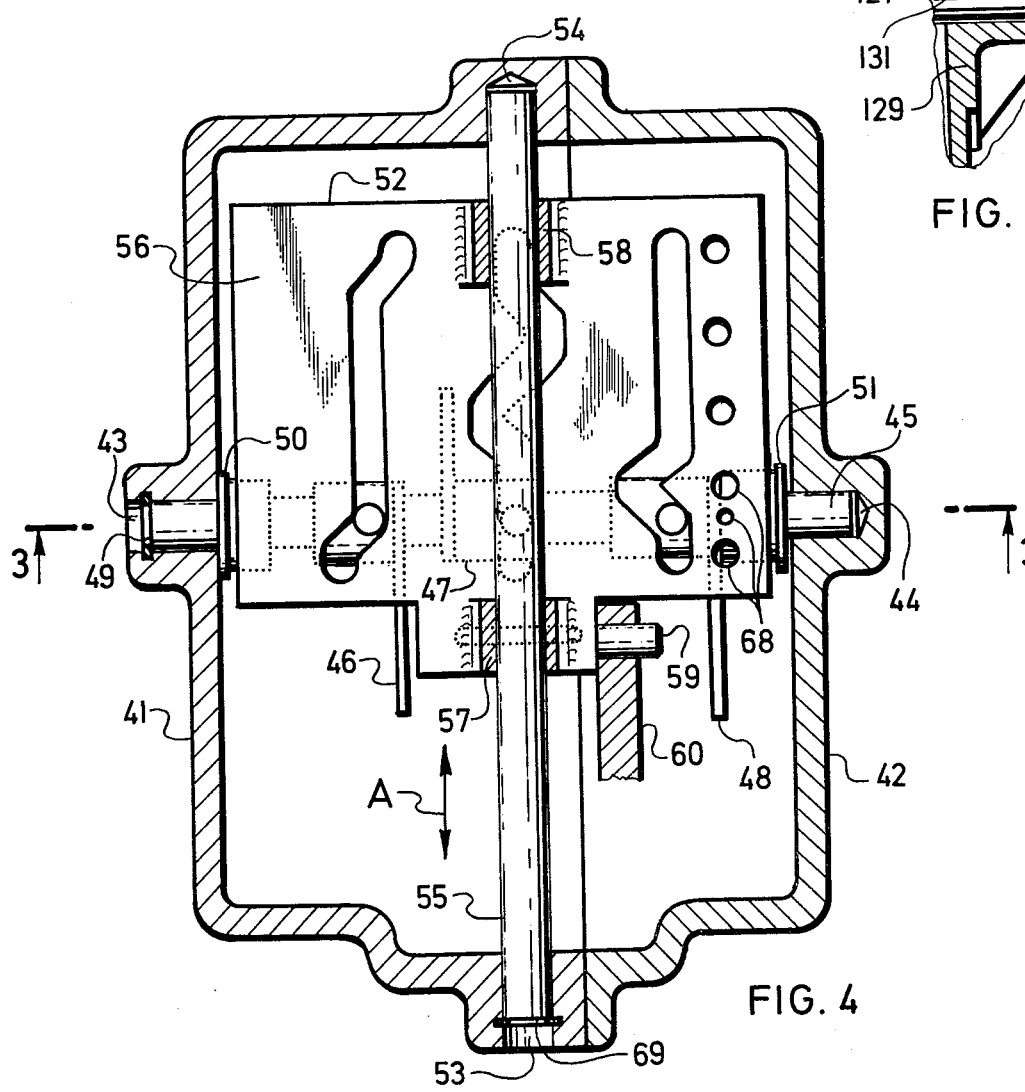
FIG. 4 is a plane view similar to that of FIG. 1 showing the second embodiment of the present invention as depicted in FIG. 3.

In the embodiment shown in FIGS. 3 and 4, the housing, as in FIGS. 1 and 2, is formed into two sections 41 and 42. However, in this embodiment the sections are not symmetrical halves. Each of the sections 41 and 42 is provided with a hole 43 and 44 respectively, in which a shaft 45 is provided on which the selector forks 46, 47 and 48 are carried. The shaft is held by a clamping ring 49. Located at each end of the shaft 45 is a pulley 50 and 51 which again may be a simple rotatable sleeve or a roller bearing. A shift gate 52, similar to that described in connection with FIGS. 1 and 2, rests on the upper surface of the pulleys 50 and 51. The pulleys 50 and 51 are each provided with an upstanding lip or shoulder engaging the flanking edges of the gate 11 and act as a guide for the gate 11. Preferably the pulleys 50 and 51 are mounted so as to be in fixed axial position of the shaft 45 so as to limit the transverse movement of the gate 11.

In the embodiment of the FIGS. 3 and 4 the housing sections are not equal, the left section 41 being somewhat larger than the right section 42. The left section 41 is provided with bores 53 and 54 in which the longitudinal or guide rod 55 for the gate 11 is secured. The guide rod 55 is circular in cross section. The gate 11 is similarly a flat rectangular plate like member 56 provided with a plurality of cam slots conforming in number to the forks 46, 47 and 48. The plate like member 56 is provided with a pair of slide bearings 57 and 58 at each of its forward and rear ends through which the guide rod 55 fits. The slide bearings 57 and 58 extend upwardly from the top face of the gate 11 substantially along the central line of the plate 56 as distinguished from the arrangement as shown in FIGS. 1 and 2 wherein the slide bearings extend at one edge of the gate 11. The plate like member 56 forming the gate also has a laterally extending pin 59 about which is journalled a push-pull shift lever 60.

A cover 61 is secured by screws 62 and 63 to both sections 41 and 42 of the housing. A latch or locking mechanism consisting of a supporting screw 64 in which a pawl 65 is held against falling out by a retaining ring 66 is provided just as in the earlier embodiment. A spring 67 urges the pawl 66 against the top surface of the gate 52 and against the pulleys 50 and 51. A plurality of lined recesses 68 indicating the given shift positions are provided in the upper surface of the gate 52. The guide rod 55 is held by a retaining ring 69.

Figure 5:
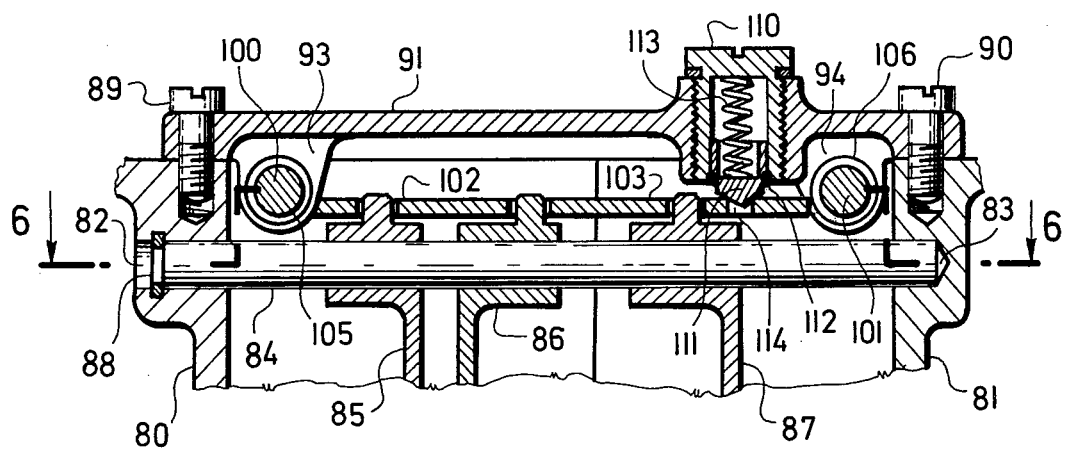
FIG. 5 is a sectional view similar to FIGS. 1 and 3 showing still a third embodiment of the present invention.
Figure 6:
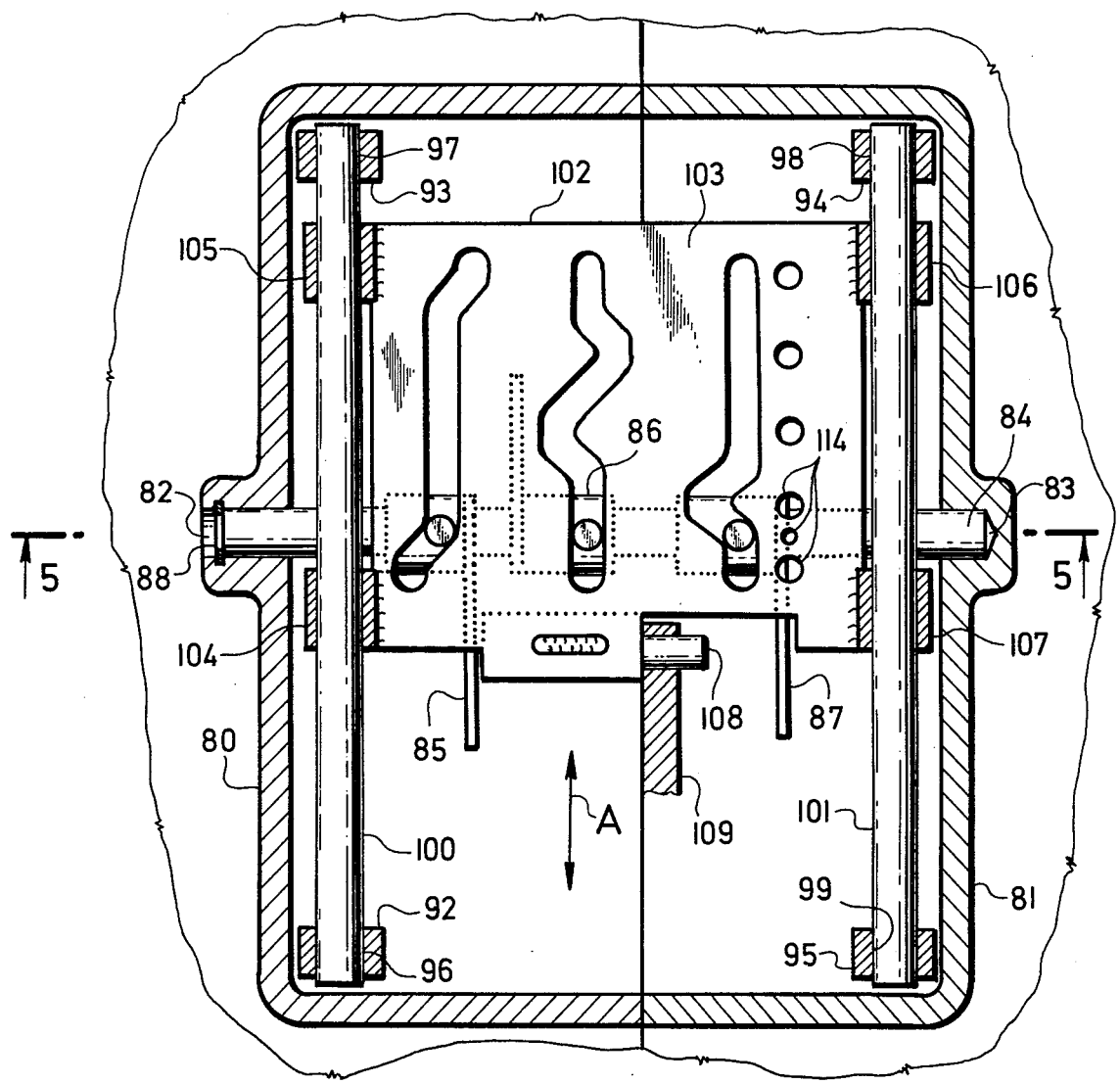
FIG. 6 is a plane view similar to that of FIGS. 2 and 4 showing the arrangement of the third embodiment of the present invention.

In the third embodiment, shown in FIGS. 5 and 6, the housing comprises a left section 80 and a right section 81 each having a hole 82 and 83, respectively, in which is secured a shaft 84 on which selector forks 85, 86 and 87 are slidably retained. A retaining ring 88 secures the rod 84 in position within the housing. Secured by screws 89 and 90, a cover is precisely positioned over the top of the housing. The cover is provided with two pair of aligned supporting blocks 92, 93 and 94, 95 respectively positioned adjacent the four corners. Each of the blocks of each pair 92, 93 and 94, 95 is provided with a hole 96, 97, 98 and 99, respectively. A circular rod 100 is carried within the holes 96 and 97 while another circular rod 101 is positioned in holes 98 and 99. This embodiment provides two fixed guide rods running parallel to each other and parallel to the longitudinal axial movement of the gate. The second guide rod acts in place of the rotatable pulley to stabilize the gate against rotation about the axis of the other guide rod.

A gate 102 similar to those previously described comprising a flat plate like member 103 is provided with two pair of slide bearing 104, 105 and 106, 107 which respectively receive the rods 100 and 101. So that the gate 102 is slidable along the axis parallel thereto. An actuating pin 108 is fixed to the rear edge of the gate 102 and has journalled about it a push-pull lever 109.

The cover 91 is provided with a latch or locking mechanism comprising a hollow screw 110, a movable pawl 111, a retaining ring 112 and a spring 113. As in the other embodiments the pawl engages the upper surface of the gate 102 and is adapted to fit in any one of the aligned holes 114 which index the gate 112 in its shift position.

Figure 7:
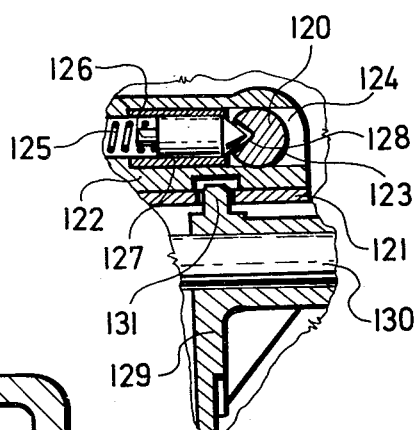
FIG. 7 is a partial sectional view showing the detail of still a third embodiment of the present invention and particularly the latching mechanism for this fourth embodiment.

A further embodiment in which a modified latch mechanism and arrangement is provided is depicted in FIG. 7. In this embodiment only the latch mechanism is depicted and described. The gate and its means for supporting it corresponds to that shown in FIGS. 1 and 2. Here the latch mechanism includes a second guide rod 120 of circular cross section arranged above the shift gate 121. Secured to the top surface of the gate 121 is a body 122 in which a guide hole 123 for the rod 120 is provided. The body 122 may extend along the entire length of the gate 121 or may in fact be in two or more sections. In any event the body 122 provides a slide bearing for movement along the rod 120. Extending laterally or perpendicularly to the axis of the hole 123 is a blind bore 124 which terminates to one side (left side as seen in the drawing) of the rod 120 in a closed bottom wall. A spring 125 is located in the blind bore 124 engaging the bottom wall and is compressed against a movable pawl 126 held within a cylindrical bush 127. The pawl 126 is adapted to press outwardly against the surface of the rod 120. The surface of the rod is provided with a plurality of spaced recesses 128 conforming to the indexing positions of the gate 121 in its shift and neutral positions. The selector forks exemplified by one, labelled 129, is held slidably on a transverse shaft 130. The fork actuating pin 131 extends upwardly through a slot formed in the gate 121 into a groove formed on the lower surface of the body 122. A cover is secured to the housing.

Each of the embodiments shown in the Figures function in the same manner, each being characterized by a shaft on which the selector forks are slidably arranged and at least one guide rod on which the shift gate is slidably retained in position with the forks. The gate is stabilized for movement in a fixed plane by either the roller means exemplified by the pulleys or by a second guide rod spaced from the first. The guide rod is arranged substantially parallel to the axis of movement of the gate while the shaft retaining the selector forks is arranged transversely thereto. Additionally, substantial advantage is derived from forming the guide rod and the slide bearings of conforming circular cross section. For example, easy shifting of the gate is provided in stabilized plane, and the gate may be biased in the stabilized plane, by action of spring means on the surface of the gate at a point opposite to the guide rod in relationship to the rotational movement of the gate. A latch mechanism is provided for indexing the gate into its fixed positions corresponding to the shift and neutral positions. The latch mechanism advantageously includes the resilient means for biasing the gate in its relative position with respect to the forks so that accurate and proper movement can be obtained.

Various embodiments and arrangements have been shown, others will be obvious to those skilled in this art. Accordingly, it is intended that the present disclosure be taken as illustrative of the invention and not as a limiting of the invention.

What is claimed:

1. In a gear box having a housing in which a plurality of selector forks are mounted to be movable along a common axis and a substantially flat rectangular gate movable in an axis angular to said common axis, said gate having means for engaging and shifting each of said selector forks into predetermined positions on movement thereof, the improvement for mounting said gate comprising an elongated guide rod secured at each end to said housing parallel to the axis of movement, at least one slide bearing having a conforming bore fixed to said gate and located about said guide rod and a rotatable sleeve journalled about the common axis of said selector forks engaging the surface of said gate at a point remote from said guide rod for stabilizing the gate against rotation about the axis of said guide rod.

2. The improvement according to claim 1 wherein the elongated guide rod is located between the edges of said gate and a pair of rotatable sleeves is arranged along the respective opposite edges.

3. The improvement according to claim 1 wherein said guide rod is located along one edge of said gate and said rotatable sleeve is arranged along the other.

4. The improvement according to claim 1 including latch means for securing said gate in predetermined index positions on movement thereof.

5. The improvement according to claim 4 wherein said latch means is resiliently biased and is mounted opposite said means for stabilizing said gate.

6. The improvement according to claim 4 wherein said latch means includes a pawl, spring means for biasing said pawl into slidable engagement with one face of said gate and a plurality of spaced recesses formed in said gate for receiving said pawl.

7. The improvement according to claim 4 wherein said latch means includes a pawl, spring means for biasing said pawl into engagement with the surface of said guide rod, said guide rod having a plurality of recesses for receiving said pawl.

8. The improvement according to claim 1 wherein said housing includes a cover, said guide rod being fixed at its end within said cover.

9. The improvement according to claim 1 wherein said selector forks are located on a shaft and fixed within said housing along an axis perpendicular to the axis of said gate guide rod.

10. The improvement according to claim 1 wherein said guide rod and said slide bearing bore have circular cross sections.

* * * * *